(12) United States Patent
Konuskan et al.

(10) Patent No.: US 9,843,372 B2
(45) Date of Patent: Dec. 12, 2017

(54) METHODS, NETWORK NODE, AND USER EQUIPMENT FOR UPLINK MULTIPLE-INPUT-MULTIPLE-OUTPUT

(71) Applicant: Telefonaktiebolaget L M Ericsson (publ), Stockholm (SE)

(72) Inventors: Cagatay Konuskan, Stockholm (SE); Erik Larsson, Uppsala (SE); Bo Göransson, Sollentuna (SE); Johan Hultell, Solna (SE); Peter Von Wrycza, Stockholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 467 days.

(21) Appl. No.: 13/882,840

(22) PCT Filed: Jan. 30, 2013

(86) PCT No.: PCT/SE2013/050069
§ 371 (c)(1),
(2) Date: May 1, 2013

(87) PCT Pub. No.: WO2013/115714
PCT Pub. Date: Aug. 8, 2013

(65) Prior Publication Data
US 2014/0050161 A1    Feb. 20, 2014

Related U.S. Application Data

(60) Provisional application No. 61/592,926, filed on Jan. 31, 2012.

(51) Int. Cl.
*H04L 1/00* (2006.01)
*H04W 52/42* (2009.01)
(Continued)

(52) U.S. Cl.
CPC ......... *H04B 7/0486* (2013.01); *H04B 7/0456* (2013.01); *H04L 1/0002* (2013.01);
(Continued)

(58) Field of Classification Search
CPC .. H04B 7/0404; H04B 7/0623; H04B 7/0456; H04B 7/06; H04B 7/0617; H04B 7/0669;
(Continued)

(56) References Cited

U.S. PATENT DOCUMENTS 6,301,485 B1 * 10/2001 Lee ................................ 455/522
8,391,912 B2 * 3/2013 Okvist et al. ................. 455/522
(Continued)

FOREIGN PATENT DOCUMENTS

| CN | 102035615 A | 4/2011 |
|----|----|----|
| WO | WO 2011/041719 A2 | 4/2011 |
| WO | WO 2011/127358 A1 | 10/2011 |

OTHER PUBLICATIONS

International Search Report, PCT Application No. PCT/SE2013/050069, dated Jun. 21, 2013.
(Continued)

*Primary Examiner* — Ayaz Sheikh
*Assistant Examiner* — Debebe Asefa
(74) *Attorney, Agent, or Firm* — Sage Patent Group

(57) ABSTRACT

It is presented a method for controlling uplink multiple-input-multiple-output, MIMO. The method is performed in a network node and comprises the steps of: determining an inter-stream interference between two uplink streams in MIMO, Multiple Inputs Multiple Outputs, transmission; and controlling a selection of E-TFC, Enhanced dedicated transport channel Transport Format Combination, in response to the determined interference.

42 Claims, 6 Drawing Sheets

(51) Int. Cl.
*H04W 52/26* (2009.01)
*H04B 7/04* (2017.01)
*H04B 7/0456* (2017.01)

(52) U.S. Cl.
CPC .......... *H04L 1/0006* (2013.01); *H04L 1/0034* (2013.01); *H04W 52/267* (2013.01); *H04W 52/42* (2013.01)

(58) Field of Classification Search
CPC ... H04B 7/0426; H04L 1/0625; H04L 1/0668; H04L 27/362; H04W 52/08; H04W 52/146; H04W 52/42
USPC .......................... 370/254–350; 709/201–213
See application file for complete search history.

(56) References Cited

U.S. PATENT DOCUMENTS

| | | | | |
|---|---|---|---|---|
| 8,599,777 | B2* | 12/2013 | Vitthaladevuni | H04L 1/0003 370/329 |
| 2011/0263281 | A1* | 10/2011 | Cai et al. | 455/501 |
| 2012/0177089 | A1* | 7/2012 | Pelletier | H04B 7/0417 375/219 |
| 2012/0287965 | A1* | 11/2012 | Sambhwani et al. | 375/141 |

OTHER PUBLICATIONS

Written Opinion of the International Searching Authority, PCT Application No. PCT/SE2013/050069, dated Jun. 21, 2013.
Ericsson et al., "On Grant and E-TFC Selection for Uplink MIMO with 64QAM", Agenda Item 6.6.1; 3GPP TSG-RAN WG1 #68bis, R1-121768, Jeju South Korea, Mar. 26-30, 2012, 6 pp.
Ericsson et al., "Quality Control of the Secondary Stream for Uplink MIMO with 64QAM", Agenda Item 6.6.1, 3GPP TSG RAN WG1 Meeting #68, R1-120344, Dresden, Germany, Feb. 6-10, 2012, 7 pp.
Ericsson et al., "Initial considerations on the design for UL MIMO for HSUPA", Agenda Item 5.5, 3GPP TSG RAN WG1 Meeting #63bis, R1-110496, Dublin, Ireland, Jan. 17-21, 2011, 16 pp.
3GPP, Technical Specification: "3$^{rd}$ Generation Partnership Project; Technical Specification Group Radio Access Network; Medium Access Control (MAC) protocol specification (Release 11)", 3GPP TS 25.321, V11.0.0, Dec. 2011, 198 pp.
3GPP, Technical Specification: "3$^{rd}$ Generation Partnership Project; Technical Specification Group Radio Access Network; Spreading and modulation (FDD) (Release 11)", 3GPP TS 25.213, V11.0.0, Dec. 2011, 43 pp.
3GPP, Technical Specification: "3$^{rd}$ Generation Partnership Project; Technical Specification Group Radio Access Network; Physical layer procedures (FDD) (Release 11)", 3GPP TS 25.214, V11.0.0, Dec. 2011, 106 pp.
3GPP, Technical Report: "3$^{rd}$ Generation Partnership Project; Technical Specification Group Radio Access Network; Uplink Multiple Input Multiple Output (MIMO) for High Speed Packet Access (HSPA) (Release 11)", 3GPP TR 25.871, V11.0.0, Sep. 2011, 42 pp.
Ericsson, "Design Aspects for Uplink MIMO with 64QAM", Agenda Item 6.6.1, 3GPP TSG RAN WG1 Meeting #68, Dresden, Germany, Feb. 6-Feb. 10, 2012, R1-120343, 8 pp.
Nokia Siemens Networks, "MIMO with 64QAM for HSUPA", Agenda Item 13.1, 3GPP TSG RAN Meeting #54, Berlin Germany, Dec. 6-Dec. 9, 2011, RP-111642, 15 pp.
Office Action for Korean Patent Application No. 10-2014-7024339, 4 pages (dated Jul. 14, 2017).
Office Action for Chinese Patent Application No. 201380007294.4, 12 pages (dated Dec. 30, 2016).

* cited by examiner

Control E-TFC selection by signalling two different sets of E-TFC$_{ref}$ $\Delta_{EDPDCH}$, one for each rank ⎯ 400

Fig. 4

Control E-TFC selection by signalling two different sets of $\Delta_{EDPDCH}$, (one for each rank) but keep one set of E-TFC$_{ref}$ ⎯ 500

Fig. 5

Control E-TFC selection by signalling two different sets of E-TFC$_{ref}$ (one for each rank) but keep one set of $\Delta_{EDPDCH}$ ⎯ 600

Fig. 6

Control E-TFC selection for rank 2 transmissions using ay least one grant offset value which is combined with a serving grant value (power measure) ⎯ 700

Fig. 7

METHODS, NETWORK NODE, AND USER EQUIPMENT FOR UPLINK MULTIPLE-INPUT-MULTIPLE-OUTPUT

CROSS REFERENCE TO RELATED APPLICATIONS

This application is a 35 U.S.C. §371 national stage application of PCT International Application No. PCT/SE2013/050069, filed on 30 Jan. 2013, which itself claims the benefit of U.S. provisional Patent Application No. 61/592,926, filed 31 Jan. 2012, the disclosures and contents of both of which are incorporated by reference herein in their entirety.

TECHNICAL FIELD

The invention relates to uplink MIMO (multiple-input-multiple-output) and control thereof.

BACKGROUND

At 3GPP (Third Generation Partnership Project) RAN (Radio Access Network) #54 plenary meeting a work item (WI) on MIMO with 64QAM (Quadrature Amplitude Modulation) for HSUPA (High Speed Uplink Packet Access) was initiated (see [1]). The WI initialization was a result of extensive studies regarding potential benefits and solutions performed during the study item (SI) phase; see [2] for a summary of the findings.

For a UE (User Equipment) configured in uplink MIMO mode either single or dual-stream transmissions can take place; also referred to as rank 1 and rank 2 transmissions, respectively. Dual-stream transmissions are mainly useful in environments with high SINRs (Signal to Interference plus Noise Ratio), and where the channel exhibits scattering (and/or cross-polarized antennas are used). When single-stream transmissions are scheduled, the pre-coding gain will instead improve the link budget.

Current proposals and discussions for how to design the UL (uplink) MIMO with 64QAM feature can be found in e.g. [3] and the references therein. Some potential design choices for HSUPA MIMO with 64QAM that may be used include:

- A pre-coded channel layout where all physical channels are pre-coded with a primary or secondary pre-coding vector is adopted.
- P-DPCCH (Primary Dedicated Physical Control Channel), E-DPCCH (E-DCH (Enhanced Dedicated Channel) Dedicated Physical Control Channel), S-E-DPCCH, (Secondary E-DCH Dedicated Physical Data Channel) E-DPDCH (E-DCH Dedicated Physical Data Channel) and HS-DPCCH (High Speed Dedicated Physical Control Channel) are precoded using the primary pre-coding vector.
- S-DPCCH (Secondary Dedicated Physical Control Channel) and S-E-DPDCH (Secondary E-DPDCH) are pre-coded using the secondary pre-coding vector.
- A common grant which is divided evenly between streams is adopted. Hence, the same transmit power is allocated to E-DPDCH and S-E-DPDCH.
- One ILPC (Inner Loop Power Control) operating on the P-DPCCH and one OLPC (Outer loop power control) targeting the quality of the primary data stream E-DPDCH; and/or
- The primary data stream E-DPDCH and the secondary data stream S-E-DPDCH use the same channelization code setting (2×SF2 (Spreading Factor 2)+2×SF4 (Spreading Factor 4)) during rank 2 transmissions.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

It is an object to improve management of uplink MIMO, and in particular to take inter-stream interference into account when selecting data rates in more efficient way than in prior art.

According to a first aspect, it is presented a method for controlling uplink multiple-input-multiple-output, MIMO. The method is performed in a network node and comprises the steps of: determining an inter-stream interference between two uplink streams in MIMO, Multiple Inputs Multiple Outputs, transmission; and controlling a selection of E-TFC, Enhanced dedicated transport channel Transport Format Combination, in response to the determined inter-ference. By controlling the selection of E-TFC based on the presence of inter-stream interference, the data rate can be reduced prior to the need to involve OLPC which increases signalling and control delay.

The step of controlling may comprise signalling reference values defining a mapping between power and data rate, in response to the determined inter-stream interference. The mapping can then be used by the UE when selecting E-TFC based on a grant value.

The step of controlling may comprise signalling a reference value offset for compensating for inter-stream interference. This can be an efficient way to signal parameters required for the inter-stream interference compensation.

The step of controlling may comprise: signalling two different sets of parameters for derivation of reference gain factors, for two different ranks, and one set of reference E-TFCs.

The step of controlling may comprise: signalling a set of parameters for derivation of reference gain factors for rank 1 operation and an offset for rank 2 operation, wherein the offset is relative to the set of parameters for derivation of reference gain factors for rank 1 operation, and signalling one set of reference E-TFCs.

The step of controlling may comprise: signalling two different sets of parameters for derivation of reference gain factors and two different sets of reference E-TFCs, for two different ranks, respectively.

The parameters for derivation of reference gain factors may be $\Delta_{E\text{-}DPDCH}$ parameters.

The step of controlling may comprise: signalling at least one grant offset value, wherein the at least one grant offset value is an offset relative to a serving grant.

The step of controlling may comprise signalling via L2 signalling, RLC, Radio Link Control, signalling or dynamic signalling.

According to a second aspect, it is presented a network node arranged to control uplink multiple-input-multiple-output, MIMO, the network node comprising: a memory device containing functional modules; and a processor. The processor is configured to execute computer program instructions from the functional modules of the memory device to: determine an inter-stream interference, between two uplink streams in MIMO, Multiple Inputs Multiple Outputs, transmission; and control a selection of E-TFC, Enhanced dedicated transport channel Transport Format Combination, in response to the determined interference.

The instructions to control may comprise instructions to signal reference values defining a mapping between power and data rate, in response to the determined inter-stream interference.

The instructions to control may comprise instructions to signal a reference value offset for compensating for inter-stream interference.

The instructions to control may comprise instructions to: signal two different sets of parameters for derivation of reference gain factors, for two different ranks, and one set of reference E-TFCs.

The instructions to control may comprise instructions to: signal a set of parameters for derivation of reference gain factors for rank 1 operation and an offset for rank 2 operation, wherein the offset is relative to the set of parameters for derivation of reference gain factors for rank 1 operation, and signal one set of reference E-TFCs.

The instructions to control may comprise instructions to: signal two different sets of parameters for derivation of reference gain factors and two different sets of reference E-TFCs, for two different ranks, respectively.

The parameters for derivation of reference gain factors may be $\Delta_{E\text{-}DPDCH}$ parameters.

The instructions to control may comprise instructions to: signal at least one grant offset value, wherein the at least one grant offset value is an offset relative to a serving grant.

The instructions to control may comprise instructions to signal via L2 signalling, RLC, Radio Link Control, signalling or dynamic signalling.

According to a third aspect, it is presented a method for controlling uplink multiple-input-multiple-output, MIMO. The method is performed in a user equipment, UE, and comprising the steps of: receiving a signal from a network node, the signal being dependent on an inter-stream interference between two uplink streams in MIMO, Multiple Inputs Multiple Outputs, transmission; and selecting E-TFC, Enhanced dedicated transport channel Transport Format Combination, in response to the received signal.

The step of receiving may comprise receiving reference values defining a mapping between power and data rate.

The step of receiving may comprise receiving a reference value offset for compensating for inter-stream interference.

The step of selecting may comprise: selecting E-TFC in response to the received signal comprising two different sets of parameters for derivation of reference gain factors, for two different ranks, and one set of reference E-TFCs.

The step of selecting may comprise: selecting E-TFC in response to the received signal comprising a set of parameters for derivation of reference gain factors for rank 1 operation and an offset for rank 2 operation, wherein the offset is relative to the set of parameters for derivation of reference gain factors for rank 1 operation, and comprising one set of reference E-TFCs.

The step of selecting may comprise: selecting E-TFC in response to the received signal comprising two different sets of parameters for derivation of reference gain factors and two different sets of reference E-TFCs, for two different ranks, respectively.

The parameters for derivation of reference gain factors may be $\Delta_{E\text{-}DPDCH}$ parameters.

The step of selecting may comprise translating $\Delta_{E\text{-}DPDCH}$ parameters to quantised amplitude ratios, $A_{ed}$, and deriving the reference gain factors from the quantised amplitude ratios, $A_{ed}$.

The step of selecting may comprise: selecting E-TFC in response to the received signal comprising at least one grant offset value, wherein the at least one grant offset value is an offset relative to a serving grant.

the step of receiving may comprise receiving via L2 signalling, RLC, Radio Link Control, signalling or dynamic signalling.

According to a fourth aspect, it is presented a user equipment, UE, arranged to control uplink multiple-input-multiple-output, MIMO, the network node comprising: a memory device containing functional modules; and a processor. The processor is configured to execute computer program instructions from the functional modules of the memory device to: receive a signal from a network node, the signal being dependent on an inter-stream interference between two uplink streams in MIMO, Multiple Inputs Multiple Outputs, transmission; and select E-TFC, Enhanced dedicated transport channel Transport Format Combination, in response to the received signal.

The instructions to receive between power and data rate, in response to the determined inter-stream interference.

The instructions to receive may comprise instructions to receive reference values defining a mapping between power and data rate, in response to the determined inter-stream interference.

The instructions to select may comprise instructions to: select E-TFC in response to the received signal comprising two different sets of parameters for derivation of reference gain factors, for two different ranks, and one set of reference E-TFCs.

The instructions to select may comprise instructions to: select E-TFC in response to the received signal comprising a set of parameters for derivation of reference gain factors for rank 1 operation and an offset for rank 2 operation, wherein the offset is relative to the set of parameters for derivation of reference gain factors for rank 1 operation, and comprising one set of reference E-TFCs.

The instructions to select may comprise instructions to: select E-TFC in response to the received signal comprising two different sets of parameters for derivation of reference gain factors and two different sets of reference E-TFCs, for two different ranks, respectively.

The parameters for derivation of reference gain factors may be $\Delta_{E\text{-}DPDCH}$ parameters.

The instructions to select may comprise instructions to translate $\Delta_{E\text{-}DPDCH}$ parameters to quantised amplitude ratios, $A_{ed}$, and deriving the reference gain factors from the quantised amplitude ratios, $A_{ed}$.

The instructions to select may comprise instructions to: select E-TFC in response to the received signal comprising at least one grant offset value, wherein the at least one grant offset value is an offset relative to a serving grant.

The instructions to receive may comprise instructions to receive via L2 signalling, RLC, Radio Link Control, signalling or dynamic signalling.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 4 is a flow chart illustrating a method according to one embodiment;

FIG. 5 is a flow chart illustrating a method according to one embodiment;

FIG. 6 is a flow chart illustrating a method according to one embodiment;

FIG. 7 is a flow chart illustrating a method according to one embodiment;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Grant and E-TFC Selection Procedure

For legacy UEs, data (transport block size) is set and controlled via the grant & E-TFC selection procedure. The grant, which is defined as the power ratio between the E-DPDCH and DPCCH (Dedicated Physical Control Channel), is controlled by the network via absolute and relative grants transmitted over the E-AGCH (E-DCH Absolute Grant Channel) and E-RGCH (E-DCH Relative Grant Channel) channels, respectively. The grant is essentially a power measure which allows the network to control the interference a certain UE is allowed to create. The grant gives the UE an "upper bound" on how much data it may transmit, and the exact number of data bits will depend on power and buffer statuses, and essentially a formula configured via a number of reference values signalled by higher-layers; see e.g. sub-clause 11.8.1.4 in [4].

In accordance with one embodiment, MIMO operation uses a single ILPC operating on the P-DPCCH (corresponding to DPCCH of the legacy scenario with no MIMO) and a single OLPC that controls the quality of the primary stream). One of the main reasons for this approach is to keep commonality with CLTD (Closed-Loop Transmit Diversity) (for rank 1 transmissions), and another underlying reason is that the primary stream corresponds to a "legacy" stream, whereas the secondary stream is more of a "best effort" stream. In a further embodiment, a common grant is used that is shared equally between streams, which may imply that power is shared equally between streams. In yet a further embodiment, legacy E-TFC selection procedures are used based on the effective (serving) grant (corresponding to the whole signalled grant for rank 1 and half the signalled grant for rank 2) to determine the transport block size for the primary stream. Consequently, the data (E-DPDCH and S-E-DPDCH) transmit power can also be determined via legacy procedures based on the primary stream E-TFCI (E-DCH Transport Format Combination Indicator).

Potential Problems with Existing Solutions

Figure 1:
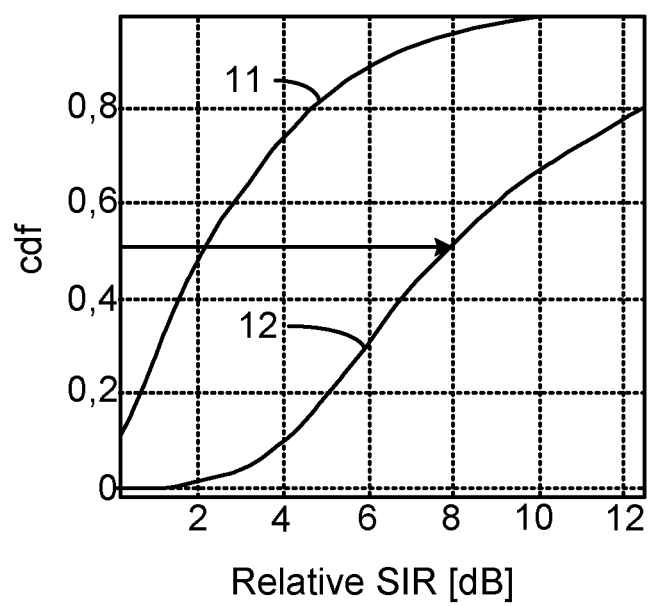
FIG. 1 is a schematic graph illustrating a cumulative distribution function for a primary and secondary stream in a rank 2 scenario.

Since there is code-reuse between streams for dual stream transmissions, it will be inevitably that inter-stream interference will occur whenever dual streams are transmitted. The degree of inter-stream interference will be scenario dependent as well as receiver dependent. For example, the inter-stream interference impact will be different for a linear MMSE (Minimum Mean Squared Error) receiver or a SIC (Successive Interference Cancellation) receiver. An example of the impact of inter-stream interference is seen in FIG. 1, illustrating cumulative distribution functions (CDFs) for single stream SIR (Signal to Interference Ratio) relative dual stream SIR in dB for the primary stream 11 and the secondary stream 12. The impact is illustrated by the difference between a single stream SIR and dual stream SIRs (primary stream 11 and secondary stream 12). In general, the single stream SIR is larger than the dual stream SIRs (11 and 12) due to the inter-stream interference affecting the dual stream case. Hence, the primary stream 11 shows the degradation in SIR for the primary stream due to inter-stream interference caused by the secondary stream during rank 2 transmission. The SIR degradation for the secondary stream 12 is a combination of that it uses the weaker eigen-mode of the channel and the strong inter-stream interference from stream 1. It is noted that the results are impacted by estimation imperfections.

By way of example, the inter-stream interference impact is now explained for a simplified receiver. Embodiments are not limited to the example receiver. For dual stream transmissions the received (despreading channelization code k) signal can be written as follows:

$$r = HWS + u = Hw_1 s_1 + Hw_2 s_2 + u = h_{eff,1} s_1 + h_{eff,2} s_2 + u \quad (1)$$

where $S=[s_1\ s_2]T$, with $s_i$ denoting the signal for stream i and data code k (i=1 corresponds to E-DPDCH and i=2 corresponds to S-E-DPDCH), u represents the impairments, and $h_{eff}$ denotes the effective channel, which is defined as the combination of the actual net channel matrix H and a pre-coding weight vector element w. H is the net channel matrix (to simplify, only a single-tap 2×2 channel matrix is considered), which can be represented as follows:

$$H = \begin{bmatrix} h_{11} & h_{12} \\ h_{21} & h_{22} \end{bmatrix},$$

with $h_{kl}$ denoting the channel response from transmit antenna l and receive antenna k, and W is the precoding matrix which can be represented as follows:

$$W = [w_1\ w_2] = \begin{bmatrix} w_{11} & w_{21} \\ w_{21} & w_{22} \end{bmatrix}$$

Note that $w_1$ and $w_2$ are the pre-coding vectors associated with stream one and stream two, respectively. Note also that this is a simplified receiver structure. Nevertheless, the embodiments are applicable to general receiver structures, including, for example any defined number of receiver antennas, chip or slot level processing, etc.

The corresponding received channel for single stream transmissions can be represented as follows:

$$r = HWS + u = Hw_1s_1 + u = h_{\textit{eff},1}s_1 + u \tag{2}$$

Hence, the difference of detecting $s_1$ for single or dual stream transmissions is the appearance of the extra term as follows:

$$h_{\textit{eff},2}s_2 \tag{3}$$

for the dual stream transmission case. This extra term is due to the inter-stream interference, i.e. $s_1$ and $s_2$ will interfere each other. When detecting $s_1$ for rank 2 using a linear receiver the extra term (3) is incorporated in the general impairment term u, hence "increasing" the total interference.

The legacy E-TFC selection mechanism operates on the grant (a power measure) and hence it does not really take inter-stream interference into account. The E-TFC selection mechanism was originally designed for a legacy scenario where (as explained above) there is no inter-stream interference to consider. This will affect the dual stream performance. In many cases there is too poor received SINRs to support the TBSes (Transport Block Sizes) provided via the grant and E-TFC selection procedure. This will trigger the OLPC which will increase the SIR target and eventually reduce the E-TFC to a level that the receiver can support (sufficiently good SINRs). This is a slow process and it wastes valuable DPCCH power. A better solution is to take the inter-stream interference explicitly into account in the E-TFC selection procedure.

More Details on Embodiments

Figure 2:
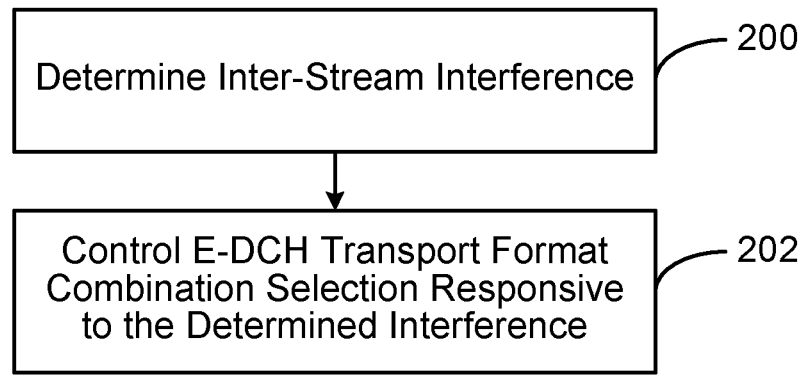
FIG. 2 is a flow chart illustrating a method according to one embodiment.

In accordance with some embodiments, the inter-stream interference is explicitly used to control the E-TFC selection procedure. FIG. 2 is a flowchart of corresponding operations and methods that may be performed by a network node, such as a base station (Node B).

The method is arranged to control uplink MIMO.

In a determine inter-stream interference step 200, an inter-stream interference, between two uplink streams in MIMO transmission is determined. This can be a static, e.g. manually configurable value, or a dynamic value.

In a control E-DCH transport format combination selection responsive to the determined interference step 202, a selection of E-TFC is controlled in response to the determined interference.

Due to the inter-stream interference a specific grant should correspond to a lower TBS compared to if no inter-stream interference was present, i.e. a more conservative data rate. The transmit power should, however, not be affected. Accordingly, the grant functions to provide an "upper" bound on how much power a UE can utilize to transmit data, while the E-TFC selection mechanism (how to map grant to TBS) compensates for the inter-stream interference.

According to a further embodiment, the network node uses rank dependent reference E-TFCs and/or parameters for derivation of reference gain factors, e.g. rank dependent $\Delta_{E\text{-}DPDCH}$s (which can be translated to quantised amplitude ratios $A_{ed}$ which in turn are used to derive reference gain factors).

Consequently one set of reference values are used for rank 1, whereas another set of reference values are used for rank 2. Currently, one set of reference values are signalled by higher layers. Hence, the network node will signal two sets of reference values, one for rank 1 and one for rank 2. The details for how the E-TFC selection procedure works, and its relation to the reference values are described in [4], [5], [6] but for completeness some of the relevant parts in Section 3.1.1 are explained below. In essence there is one set of reference E-TFC values $$E\text{-}TFC_{ref} = \{E\text{-}TFC_{ref,1} \ldots E\text{-}TFC_{ref,m}\} \tag{4}$$

where m denotes the number of reference values, and a corresponding set of $\Delta_{E\text{-}DPDCH}$s (which can be translated to quantised amplitude ratios $A_{ed}$s):

$$\Delta_{E\text{-}DPDCH} = \{\Delta_{E\text{-}DPDCH,1} \ldots \Delta_{E\text{-}DPDCH,m}\} \tag{5}$$

Figure 3:
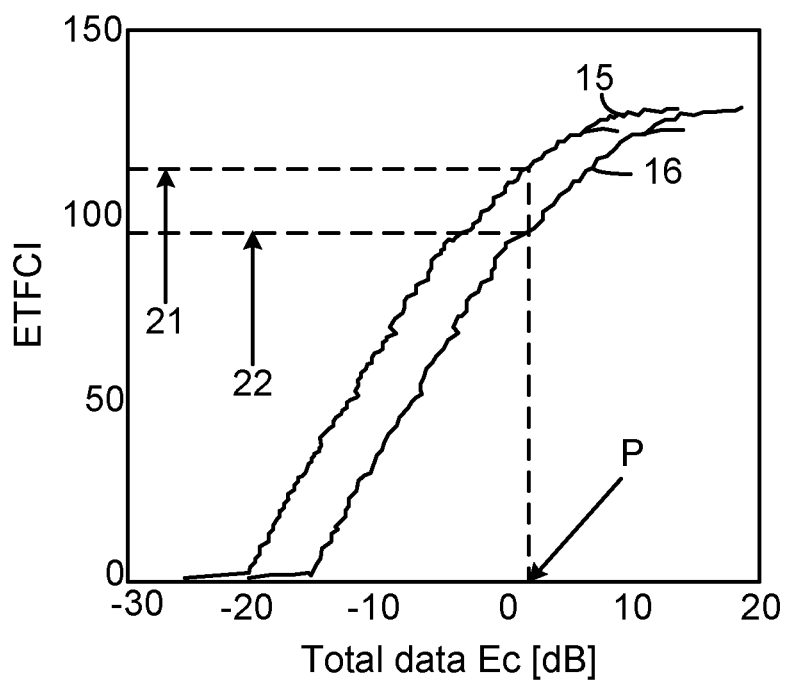
FIG. 3 is a schematic graph illustrating rank dependent values of E-TFC (Enhanced dedicated transport channel Transport Format Combination)

Various further operations and methods that may be performed by a network node to control E-TFC selection are illustrated by FIG. 3 for using the rank 1 and rank 2 values. FIG. 3 is a schematic graph illustrating rank dependent reference E-TFC values. The curves 15 and 16 are defined by reference values, such as $A_{ed}$ values or $\Delta_{E\text{-}DPDCH}$ values. The exact configuration of the curves 15 and 16 can vary, but is based on provided reference values and allows translation from a grant value to an E-TFCI value. The E-TFCI value is translated to a transport block size, where a larger transport block size represents a greater data rate An original curve 15 represents SISO (Single Input Single Output) AWGN (Additive white Gaussian noise) and corresponds to the legacy case. For a point P representing a particular grant value, this means that a first E-TFCI value 21 is achieved when the original curve 15 is used. The grant value is a dynamic value signalled by the network. Note that total data Ec (Energy per Chip) can be translated into a grant value (assuming a specific SIR target).

In accordance with embodiments presented herein, the effects of inter-stream interference are taken into account in the MIMO case. Due to the code reuse between streams for UL MIMO, a rank 2 transmission will suffer from inter-stream interference. Hence, compared to a rank 1 transmission a rank 2 transmission will suffer from a lot more interference, which means that for a given grant (P) a rank 2 transmission should map this power to a smaller E-TFCI compared to a rank 1 transmission (assuming that the reference values are designed for rank 1 transmission).

In other words, this results in a second, lower (more conservative), E-TFCI value 22, for the same point P (representing a particular grant value). To achieve this second E-TFCI value 22, a new lower curve 16 is defined according to embodiments herein. The new lower curve 16 is defined using modified reference values. As explained above, the exact configuration of the curve can vary, but the reference values provided to define the lower curve 16 to be lower than the original curve 15.

The original curve 15 is used for rank 1 scenarios and the lower curve 16 is used at least for the primary stream in rank 2 scenarios. Hence, defining the lower curve 16 with reference values achieves a better match between data power (grant) and receiver capacity (number of supported bits, E-TFCI and TBS). This mapping depends on many factors. However, it has been realised that instead of power it is rather the post-receiver signal-to-noise-and-interference ratio that is of importance for how many bits the receiver can support.

In the example shown in FIG. 3, a fixed 5 dB offset is used between the original curve 15 and the new curve 16. In other words, the new curve is obtained by shifting the original curve to the right by 5 dB, such that e.g. 0 dB becomes +5 dB.

In order to be able to define the original curve 15 and the new curve 16 of FIG. 3, a number of points can be used. The curve between the points can be interpolated and curve sections on the extremes can be extrapolated. The interpolation and extrapolation can be linear or non-linear. The curves are thus defined from points using data sets for E-TFCref (vertical scale) and $\Delta_{EDPDCH}$ (delta of E-DPDCH) which corresponds to $A_{ed}$. These operations and methods can include one or more of the following:

1. E-TFC selection (block 202 of FIG. 2) is controlled by signalling (block 400) two different sets of E-TFC$_{ref}$ and $\Delta_{EDPDCH}$ (delta of E-DPDCH), one for each rank, as illustrated by FIG. 4. In other words, the curves 15 and 16 of FIG. 3 are defined by separate points.

2. E-TFC selection (block 202 of FIG. 2) is controlled by signalling (block 500) two different sets of $\Delta_{EDPDCH}$ (one for each rank) but keep one set of E-TFC$_{ref}$, as illustrated by FIG. 5. For rank 2 the $\Delta_{EDPDCH}$ set will most likely contain larger values (larger $A_{ed}$) compared to rank 1, but not necessarily so. This alternative has the benefit of that $A_{ed}$ is a power measure which makes it potentially easier to set appropriate values that reflect the current inter-stream interference scenario. In other words, the curves 15 and 16 of FIG. 3 are defined by an identical set of E-TFC$_{ref}$ values and different values for the $\Delta_{EDPDCH}$ values, such that there is a horizontal correspondence of the points defining the curves 15 and 16. In one embodiment, the new curve 16 is obtained by, for each point defining the original curve 15, multiplying with an inter-stream interference compensation factor. When this is done for Aed, the following formula is used:

$$A_{ed\_new} = A_{ed\_original} \times A_{ISI} \quad (6)$$

Where $A_{ed\_new}$ represents the $A_{ed}$ value for the rank 2 curve (the new curve 16), $A_{ed\_original}$ represents the $A_{ed}$ value for the rank 1 curve (the original curve 15) and $A_{ISI}$ represents an inter stream interference compensation factor, which can be translated from $\Delta_{ISI}$ which is an indicator of inter stream interference and can be signalled by higher layers. $A_{ISI}$ is typically greater than 1 to obtain a lower curve for the rank 2 case.

3. E-TFC selection (block 202 of FIG. 2) is controlled by signalling (block 600) two different sets of E-TFC$_{ref}$ (one for each rank) but keep one set of $\Delta_{EDPDCH}$, as illustrated by FIG. 6. For rank 2 the E-TFC$_{ref}$ set will most likely contain lower E-TFCI values compared to rank 1, but not necessarily so. In other words, the curves 15 and 16 of FIG. 3 are defined by an identical set of $\Delta_{EDPDCH}$ values and different values for the values, such that there is a vertical correspondence of the points defining the curves 15 and 16.

An alternative but related solution to having different sets of reference values is to have one (or several) configurable offsets. This alternative can be combined with any of the points above. For example, in Point 3 above, instead of having two different sets of E-TFC$_{ref}$, a network node can perform E-TFC selection using one (or several) offset values $\alpha$ that is/are applied to the reference values for rank 2 operation, i.e. for rank 2 the reference values can be represented as follows:

$$E\text{-}TFC_{ref,i,rank2} = E\text{-}TFC_{ref,1} - \alpha$$

A potential advantage of this approach is that only one (or a few) new value needs to be signalled.

Yet another related but alternative solution is to have one (or several) grant offset values γ which the network node uses in the E-TFC selection procedure for rank 2 transmissions. Hence, instead of using the serving grant G in the E-TFC selection procedure, the selection procedure uses the effective grant G-γ. This alternative has the potential benefit of that grant is a power measure which makes it potentially easier to set appropriate values that reflect the current inter-stream interference scenario. Note though that the grant offset should not affect the transmit power setting, which essentially means that two different E-TFCIs are needed. One for determining the transmit power, and one for determining the TBS, which potentially makes this solution less attractive.

The appropriate values of the offset(s) (e.g. α and γ in the text above) or the different reference values (discussed above) will depend on how severe the inter-stream interference is, which depends on e.g. scenario and receiver type. Since the network (e.g. serving network node, NodeB) has the most knowledge about the inter-stream interference situation the values should preferably be signalled by the network. Furthermore, in most situations both the network and the UE need to know exactly how E-TFCI relates to transmit power, i.e. both the network and the UE need to know the offsets or reference values. In all alternatives discussed above, the new reference values or offsets can be configured via e.g. L2 signaling, RLC (Radio Link Control) signaling, or even dynamically using e.g. HS-SCCH (High Speed Shared Control Channel) orders. In principle, one can also envision scenarios where the UE autonomously chooses the offsets and then possibly signal the used values to the network.

Corresponding operations and methods are illustrated by the flowchart of FIG. 7, in which E-TFC selection for rank 2 transmissions is controlled (block 700) using at least one grant offset value which is combined with a serving grant value by one or more of the embodiments described above.

References to the Various Relevant Standard

Some relevant parts of various identified standards are explained below. References in the text (tables etc) refer to identified locations within the standard documents.

Ts-25.214[6]

5.1.2.5B.2.2 Computation of Reference Gain Factors

Let E-TFCI$_{ref,m}$ denote the E-TFCI of the m:th reference E-TFC, where m=1, 2, . . . , M and M is the number of signalled reference E-TFCs and E-TFCI$_{ref,1}$ < E-TFCI$_{ref,2}$ < . . . < E-TFCI$_{ref,M}$.

For each reference E-TFC, a reference gain factor $\beta_{ed,ref}$ is calculated according to $$\beta_{ed,ref} = \beta_c \cdot A_{ed}$$

where $\beta_c$ value is signalled by higher-layer or calculated as described in subclause 5.1.2.5.2 or 5.1.2.5.3 if at least one DPDCH is configured. In case no DPDCH is configured, $\beta_c$ value is set as described in subclause 5.1.2.5C. $A_{ed}$ is defined in [3] subclause 4.2.1.3 table 1B.1 when the reference E-TFCI$_{ref,m}$ is smaller than or equal to E-TFCI$_{ec,boost}$; otherwise, $A_{ed}$ is defined in [3] subclause 4.2.1.3 table 1B.2A when reference E-TFCI$_{ref,m}$ is greater than E-TFCI$_{ec,boost}$.

Ts-25.213[5]

4.2.1.3 E-DPDCH/E-DPCCH

The value of $\beta_{ed,k}$ shall be computed as specified in [6] subclause 5.1.2.5B.2, based on the reference gain factors, the spreading factor for E-DPDCH$_k$, the HARQ (Hybrid Automatic Repeat Request) offsets, and the quantization of the ratio $\beta_{ed,k}/\beta_c$ into amplitude ratios specified in Table 1B.2 for the case when E-TFCI≤E-TFCI$_{ec,boost}$ and Table 1.B.2B, for the case when E-TFCI>E-TFCI$_{ec,boost}$.

The reference gain factors are derived from the quantised amplitude ratios $A_{ed}$ which is translated from $\Delta_{E\text{-}DPDCH}$ signalled by higher layers. The translation of $\Delta_{E\text{-}DPDCH}$ into quantized amplitude ratios $A_{ed} = \beta_{ed}/\beta_c$ is specified in Table 1B.1 for the case when E-TFCI≤E-TFCI$_{ec,boost}$ and Table 1.B.2A for the case when E-TFCI>E-TFCI$_{ec,boost}$.

Example UE and Network Node Configurations

Figure 8:
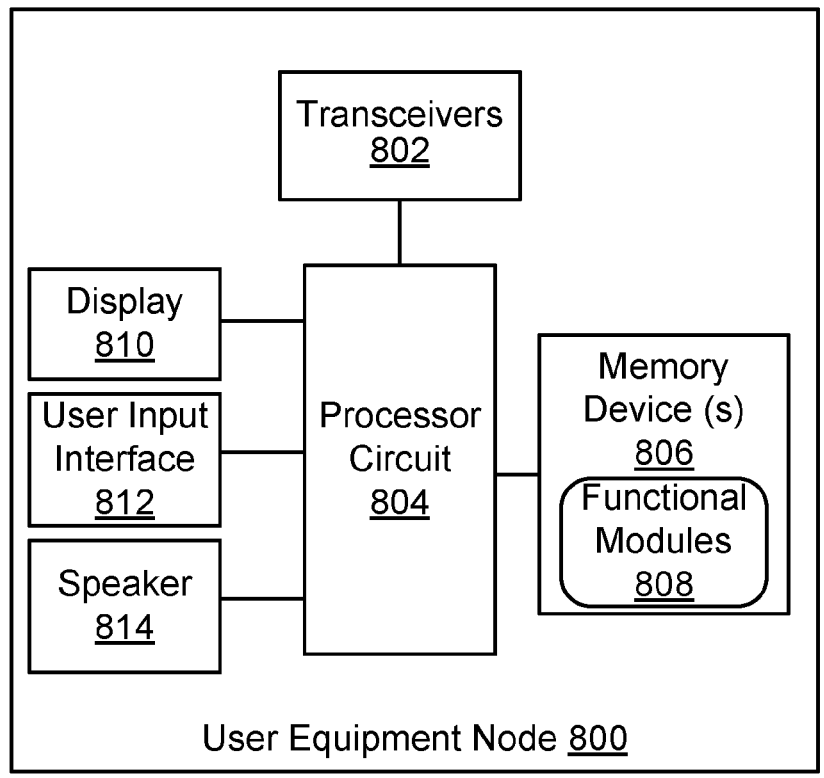
FIG. 8 is a schematic diagram illustrating an embodiment of a user equipment.

FIG. 8 is a block diagram of a UE 800 which is configured according to some embodiments. The UE 800 includes transceiver(s) 802, a processor circuit 804, and a memory device(s) 806 containing functional modules 808. The UE 800 may further include other elements, such as a display 810, a user input interface 812, and a speaker 814.

The transceiver 802 is configured to communicate with a base station (e.g., network node, Node B) over a wireless communication interface according to operations and methods disclosed herein. The processor 804 may include one or more data processing circuits, such as a general purpose and/or special purpose processor (e.g., microprocessor and/or digital signal processor). The processor 804 is configured to execute computer program instructions from the functional modules 808 of the memory device(s) 806, described below as a computer readable medium, to perform at least some of the operations and methods described herein as being performed by a UE in accordance with one or more embodiments.

The UE 800 may be a mobile telephone ("cellular" telephone), a data terminal, and/or another processing device with wireless communication capability, such as, for example, a desktop computer, a tablet computer, a laptop computer, an electronic book reader, and/or a video game console.

Figure 9:
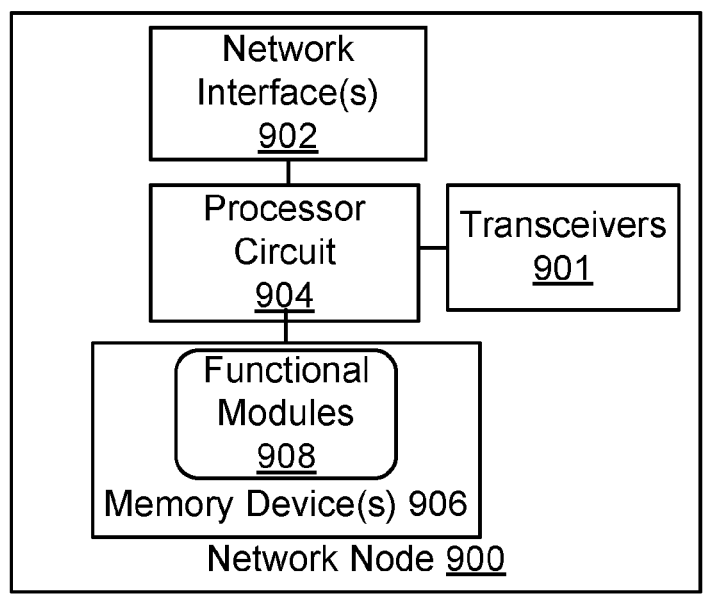
FIG. 9 is a schematic diagram illustrating an embodiment of a network node.

FIG. 9 is a block diagram of a network node 900 configured according to some embodiments, and elements of which may be included in a radio base station, such as an evolved Node B, an RNC, a Node B, and/or other nodes of a communications system.

The network node 900 can include one or more transceivers 901, a network interface(s) 902, a processor 904, and a memory device(s) 906 containing functional modules 908.

The transceiver(s) 901 (e.g., 3GPP compliant transceiver) is configured to communicate with one or more UEs or another nodes of the system. The processor 904 may include one or more data processing circuits, such as a general purpose and/or special purpose processor (e.g., microprocessor and/or digital signal processor). The processor 904 is configured to execute computer program instructions from the functional modules 908 of the memory device(s) 906, described below as a computer readable medium, to perform at least some of the operations and methods described herein as being performed by a base station or other network nodes in accordance with one or more embodiments. The network interface 902 communicates with other network nodes through one or more data networks.

Example Communication System Configuration

For purposes of illustration and explanation only, these and other embodiments are described herein in the context of operating in a Radio Access Network (RAN) that communicates over radio communication channels with UEs. It will be understood, however, that the present invention is not limited to such embodiments and may be embodied generally in any type of communication network.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP (3rd Generation Partnership Project) UMTS and LTE (Long Term Evolution) is used in this disclosure to exemplify embodiments of the invention, this should not be seen as limiting the scope of the invention to only these systems. Other wireless systems may also benefit from exploiting embodiments disclosed herein.

Also note that terminology such as base station (also referred to as Node B, eNodeB or Evolved Node B) and wireless terminal (also referred to as UE or User Equipment) should be considering non-limiting and does not imply a certain hierarchical relation between the two. In general a base station (e.g., a "NodeB", "eNodeB" or "network node") and a wireless terminal (e.g., a "UE") may be considered as examples of respective different communications devices that communicate with each other over a wireless radio channel. While embodiments discussed herein may focus on uplink wireless transmissions from a UE to an NodeB or eNodeB, embodiments of the invention may also be applied, for example, in the downlink.

Figure 10:
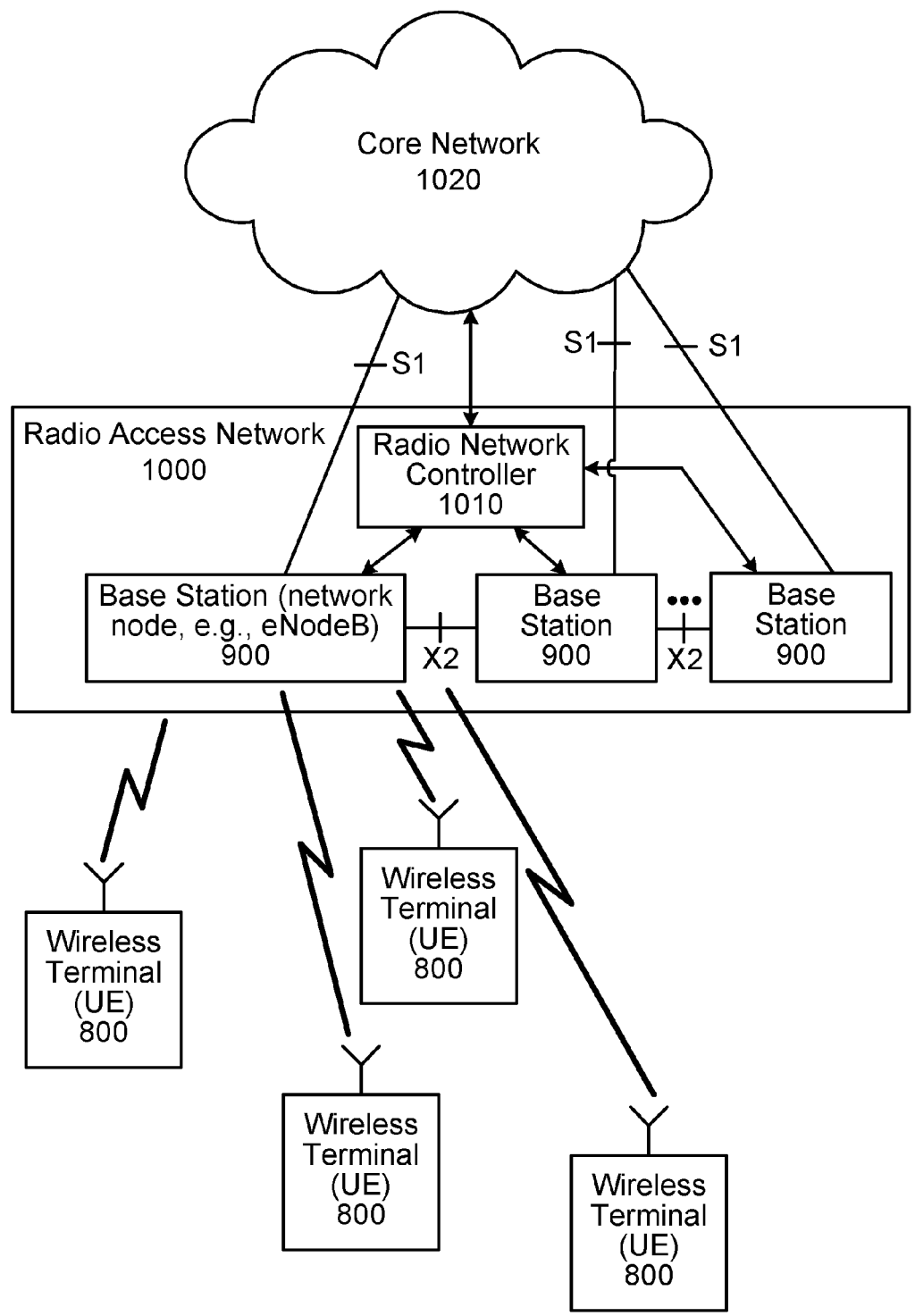
FIG. 10 is a schematic diagram illustrating an environment where embodiments presented herein can be applied.
Figure 11:
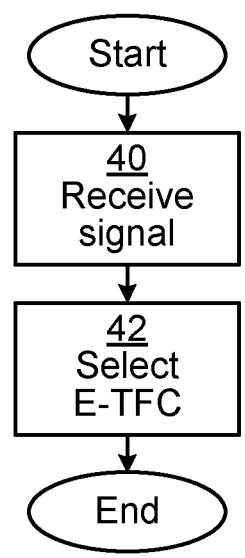
FIG. 11 is a flow chart illustrating a method according to one embodiment.

FIG. 10 is a block diagram of a communication system that is configured to operate according to some embodiments. An example RAN 1000 that includes radio base stations (e.g., NodeBs or eNodeBs) 900 that may be connected directly to one or more core networks 1020, and/or radio base stations 900 that may be coupled to core networks 1020 through one or more radio network controllers (RNC) 1010. In some embodiments, functions of radio network controller (RNC) 1010 may be performed by radio base stations 900. Radio base stations 900 communicate over wireless channels with wireless terminals (also referred to as user equipment nodes or UEs) 800 that are within their respective communication service cells (also referred to as coverage areas). The radio base stations 900 can optionally communicate with one another, e.g. through an X2 interface and with the core network(s) 1020 through S1 interfaces, as is well known to one who is skilled in the art.

The radio base stations 900 are configured to compensate for inter-stream interference in uplink transmissions by one or more of the UEs 800 by using an indication of the inter-stream interference to control E-DCH Transport Format Combination (E-TFC) selection according to the operations and methods of one or more of the embodiments described herein.

Further Definitions

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-Ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of the invention will be or become apparent to one with skill in the art upon review of the present drawings and description. It is intended that all such additional network elements, devices, and/or methods be included within this description, be within the scope of the present invention. Moreover, it is intended that all embodiments disclosed herein can be implemented separately or combined in any way and/or combination.

The invention has mainly been described above with reference to a few embodiments. However, as is readily appreciated by a person skilled in the art, other embodiments than the ones disclosed above are equally possible within the scope of the invention, as defined by the appended patent claims.

REFERENCES

[1] RP-111642, "MIMO with 64QAM for HSUPA"
[2] TR 25.871, "Uplink Multiple Input Multiple Output (MIMO) for High Speed Packet Access (HSPA)"
[3] R1-120343, "Design Aspects for Uplink MIMO with 64QAM", Ericsson, ST-Ericsson (To be submitted)

[4] TS-25.321, "Medium Access Control (MAC) protocol specification", v11.0.0
[5] TS-25.213, "Spreading and modulation (FDD)", v11.0.0
[6] TS-25.214, "Physical layer procedures (FDD)", v11.0.0

The invention claimed is:

1. A method for controlling uplink Multiple Inputs Multiple Outputs, MIMO, the method being performed in a network node and comprising:
    determining an inter-stream interference between two uplink streams in MIMO transmission; and
    controlling, in response to the determined inter-stream interference, a selection of E-TFC, Enhanced dedicated transport channel Transport Format Combination, wherein the controlling comprises signalling a reference value offset for compensating for inter-stream interference.

2. The method according to claim 1, wherein the controlling comprises signalling reference values defining a mapping between power and data rate, in response to the determined inter-stream interference.

3. The method according to claim 1, wherein the controlling comprises:
    signalling two different sets of parameters for derivation of reference gain factors, for two different ranks, and one set of reference E-TFCs.

4. The method according to claim 1, wherein the controlling comprises:
    signalling a set of parameters for derivation of reference gain factors for rank 1 operation and an offset for rank 2 operation, wherein the offset is relative to the set of parameters for derivation of reference gain factors for rank 1 operation, and signalling one set of reference E-TFCs.

5. The method according to claim 1, wherein the controlling comprises:
    signalling two different sets of parameters for derivation of reference gain factors and two different sets of reference E-TFCs, for two different ranks, respectively.

6. The method according to claim 3, wherein the parameters for derivation of reference gain factors are $\Delta_{E\text{-}DPDCH}$ parameters.

7. The method according to claim 1, wherein the step of controlling comprises:
    signalling at least one grant offset value, wherein the at least one grant offset value is an offset relative to a serving grant.

8. The method according to claim 1, wherein the controlling comprises signalling via L2 signalling, RLC, Radio Link Control, signalling or dynamic signalling.

9. The method according to claim 1, wherein the reference offset value controls a translation from a grant value to a transport block size.

10. The method according to claim 1, wherein the selection of E-TFC is controlled for rank 2 operation only.

11. A network node arranged to control uplink Multiple Inputs Multiple Outputs, MIMO, the network node comprising:
    a memory device containing functional modules; and
    a processor configured to execute computer program instructions from the functional modules of the memory device to perform operations comprising:
        determining an inter-stream interference between two uplink streams in MIMO transmission; and
        controlling, in response to the determined inter-stream interference, a selection of E-TFC, Enhanced dedicated transport channel Transport Format Combination, wherein the controlling comprises signalling a reference value offset for compensating for inter-stream interference.

12. The network node according to claim 11, wherein the controlling comprises signaling reference values defining a mapping between power and data rate, in response to the determined inter-stream interference.

13. The network node according to claim 11, wherein the controlling comprises:
    signal two different sets of parameters for derivation of reference gain factors, for two different ranks, and one set of reference E-TFCs.

14. The network node according to claim 11, wherein the controlling comprises:
    signal a set of parameters for derivation of reference gain factors for rank 1 operation and an offset for rank 2 operation, wherein the offset is relative to the set of parameters for derivation of reference gain factors for rank 1 operation, and signal one set of reference E-TFCs.

15. The network node according to claim 11, wherein the controlling comprises:
    signal two different sets of parameters for derivation of reference gain factors and two different sets of reference E-TFCs, for two different ranks, respectively.

16. The network node according to claim 13, wherein the parameters for derivation of reference gain factors are $\Delta_{E\text{-}DPDCH}$ parameters.

17. The network node according to claim 11, wherein the controlling comprises:
    signalling at least one grant offset value, wherein the at least one grant offset value is an offset relative to a serving grant.

18. The network node according to claim 11, wherein the controlling comprises signalling via L2 signalling, RLC, Radio Link Control, signalling or dynamic signalling.

19. The network node according to claim 11, wherein the reference offset value controls a translation from a grant value to a transport block size.

20. The network node according to claim 11, wherein the selection of E-TFC is controlled for rank 2 operation only.

21. A method for controlling uplink Multiple Inputs Multiple Outputs, MIMO, the method being performed in a user equipment, UE, and comprising:
    receiving a signal from a network node, the signal comprising a reference value offset for compensating for inter-stream interference between two uplink streams in MIMO transmission; and
    selecting E-TFC, Enhanced dedicated transport channel Transport Format Combination, in response to the received signal.

22. The method according to claim 21, wherein the receiving comprises receiving reference values defining a mapping between power and data rate.

23. The method according to claim 21, wherein the selecting comprises:
    selecting E-TFC in response to the received signal comprising two different sets of parameters for derivation of reference gain factors, for two different ranks, and one set of reference E-TFCs.

24. The method according to claim 21, wherein the selecting comprises:
    selecting E-TFC in response to the received signal comprising a set of parameters for derivation of reference gain factors for rank 1 operation and an offset for rank 2 operation, wherein the offset is relative to the set of parameters for derivation of reference gain factors for rank 1 operation, and comprising one set of reference E-TFCs.

25. The method according to claim 21, wherein the selecting comprises:
selecting E-TFC in response to the received signal comprising two different sets of parameters for derivation of reference gain factors and two different sets of reference E-TFCs, for two different ranks, respectively.

26. The method according to claim 23, wherein the parameters for derivation of reference gain factors are $\Delta_{E\text{-}DPDCH}$ parameters.

27. The method according to claim 26, wherein the selecting comprises translating $\Delta_{E\text{-}DPDCH}$ parameters to quantised amplitude ratios, $A_{ed}$, and deriving the reference gain factors from the quantised amplitude ratios, $A_{ed}$.

28. The method according to claim 21, wherein the selecting comprises:
selecting E-TFC in response to the received signal comprising at least one grant offset value, wherein the at least one grant offset value is an offset relative to a serving grant.

29. The method according to claim 21, wherein the receiving comprises receiving via L2 signalling, RLC, Radio Link Control, signalling or dynamic signalling.

30. The method according to claim 21, wherein the reference offset value controls a translation from a grant value to a transport block size.

31. The method according to claim 21, wherein the selection of E-TFC is controlled for rank 2 operation only.

32. A user equipment, UE, arranged to control uplink Multiple Inputs Multiple Outputs, MIMO, the UE comprising:
a memory device containing functional modules; and
a processor configured to execute computer program instructions from the functional modules of the memory device to perform operations comprising:
receiving a signal from a network node, the signal comprising a reference value offset for compensating for inter-stream interference between two uplink streams in MIMO transmission; and
selecting E-TFC, Enhanced dedicated transport channel Transport Format Combination, in response to the received signal.

33. The UE according to claim 32, wherein the receiving comprises receiving reference values defining a mapping between power and data rate, in response to the determined inter-stream interference.

34. The UE according to claim 32, wherein the selecting comprises selecting E-TFC in response to the received signal comprising two different sets of parameters for derivation of reference gain factors, for two different ranks, and one set of reference E-TFCs.

35. The UE according to claim 32, wherein the selecting comprises selecting E-TFC in response to the received signal comprising a set of parameters for derivation of reference gain factors for rank 1 operation and an offset for rank 2 operation, wherein the offset is relative to the set of parameters for derivation of reference gain factors for rank 1 operation, and comprising one set of reference E-TFCs.

36. The UE according to claim 32, wherein the selecting comprises selecting E-TFC in response to the received signal comprising two different sets of parameters for derivation of reference gain factors and two different sets of reference E-TFCs, for two different ranks, respectively.

37. The UE according to claim 34, wherein the parameters for derivation of reference gain factors are $\Delta_{E\text{-}DPDCH}$ parameters.

38. The UE according to claim 37, wherein the selecting comprises translating $\Delta_{E\text{-}DPDCH}$ parameters to quantised amplitude ratios, $A_{ed}$, and deriving the reference gain factors from the quantised amplitude ratios, $A_{ed}$.

39. The UE according to claim 32, wherein the selecting comprises selecting E-TFC in response to the received signal comprising at least one grant offset value, wherein the at least one grant offset value is an offset relative to a serving grant.

40. The UE according to claim 32, wherein the receiving comprises receiving via L2 signalling, RLC, Radio Link Control, signalling or dynamic signalling.

41. The UE according to claim 32, wherein the reference offset value controls a translation from a grant value to a transport block size.

42. The UE according to claim 32, wherein the selection of E-TFC is controlled for rank 2 operation only.

* * * * *